Jan. 5, 1971

E. B. RITCHEY 3,552,051

EAR TAG

Original Filed Oct. 23, 1965

INVENTOR.
Eugene B. Ritchey
BY
ATTORNEYS

United States Patent Office 3,552,051
Patented Jan. 5, 1971

3,552,051
EAR TAG
Eugene B. Ritchey, Rte. 2, Box 43,
Fort Lupton, Colo. 80621
Continuation of application Ser. No. 503,150, Oct. 23, 1965. This application May 16, 1969, Ser. No. 859,218
Int. Cl. G09f 3/04
U.S. Cl. 40—301
10 Claims

ABSTRACT OF THE DISCLOSURE

The invention is a combination marking tag for animals and an insertion tool for inserting the tag into the ear or other skin area of an animal, and comprises a tag having an arrow-shaped head connected by a narrow neck portion to a marking panel, and as an insertion tool a hollow tube having one end split and flattened with sharpened edges for cutting a slit in the animal's skin, the tag being connected to the rear end of the tool by folding the shoulders of the arrow and inserting the head with the edges folded into the tube end, the tag being inserted in the animal's skin by cutting a slit in the skin with the cutting end of the tool and passing the tool through the slit so that the tag is dislodged from the tool and locked in the skin with the narrow neck portion in the slit.

This is a continuation of application Ser. No. 503,150, filed Oct. 23, 1965, and now abandoned.

This invention relates to identification tags, and more particularly to identification tags for livestock, of the type which are ordinarily inserted into an animal's ears and are generally referred to as ear tags.

A primary obect of the invention is to provide a novel and improved ear tag in combination with an improved attachment tool and a simplified method of using the same to attach a tag to the ear of an animal to render the tag construction a practical usable item.

The synthetic resin, polyurethane, has proven to be an ideal material for marking tags for livestock. It is tough, pliable, resilient, and is available in various colors. Inks and paints suitable for marking and printing on the surface of polyurethane tags are also available. This material, similar to rubber in appearance, has the further important advantage of being substantially immune to the effects of sunlight and weathering in contrast to other materials such as rubber which rapidly deteriorates in sunlight. An ear tag of polyurethane can be used for a number of years.

Polyurethane has many advantages over rigid types of tags of metal and other materials and several commercial livestock tags are now being manufactured of polyurethane. However, they are of designs similar to those of rigid tags which they are replacing and use two components for attachment to the ears of livestock. None have been designed to take full advantage of polyurethane to simplify and improve ear tag construction. Accordingly, the present invention was conceived and developed to provide a more simple tag construction taking full advantage of the desirable properties of polyurethane, as will hereinafter appear.

Another object of the invention is to provide a novel and improved ear tag which is formed as a simple, neat, unitary member which attaches directly to the ear of an animal without the need of connector parts.

Another object of the invention is to provide a novel and improved ear tag which is tough, resilient and weather resistant.

Another object of the invention is to provide a novel and improved ear tag which is attached to an animal's ear, in a simple direct manner, which cannot be detached by moderate pulling such as that which might occur during the ordinary activities of the animal, yet which may be easily detached whenever necessary by a direct pull by a stockman in charge of the animal and when being so detached, the pull required will not be so great as to tear the animal's ear.

A further object of the invention is to povide a novel and improved tag which is especially adapted for use in an animal's ear, but also may be used on other portions of loose skin of an animal such as on the dewlap of a heifer.

A further object of the invention is to provide in combination with an improved and simplified ear tag, a novel and improved applicator and method of application to apply the tag to livestock in a quick, simple manner.

Another object of the invention is to provide a livestock ear tag which is a low-cost item which may be economically produced in small or large numbers and an application tool therefor which is likewise a low-cost, compact item which may be supplied at a nominal charge or even included as a complimentary item in an order of livestock tags.

With the foregoing and other objects in view, all of which more fully hereinafter appear, my invention comprises certain constructions, combinations and arrangements of parts and elements, as hereinafter described, defiend in the appended claims and illustrated in preferred embodiments in the accompanying drawing, in which:

Figures 1, 2, 3:
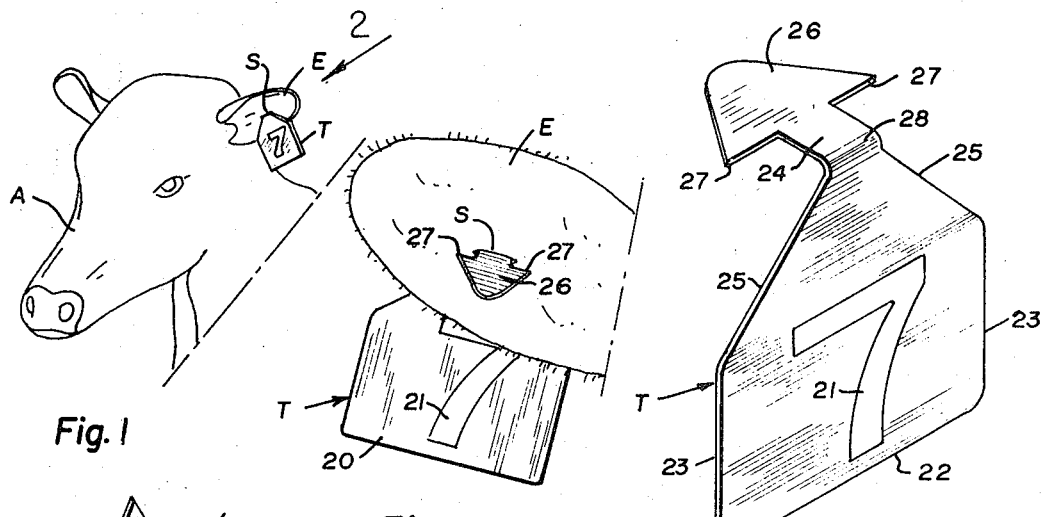
FIG. 1 is a perspective view of the head of an animal having the improved tag inserted in its left ear.
FIG. 2 is a rear view of a portion of the animal's ear with the end of the tag projecting therethrough, as taken substantially from the indicated arrow 2 at FIG. 1, but on an enlarged scale.
FIG. 3 is an isometric view of the tag per se, shown at FIGS. 1 and 2, but on a further enlarged scale.

Referring more particularly to the drawing, the improved ear tag T is a flat sheet-like member formed as a panel 20 which carries an identification symbol such as a number 21 at one or both sides of the panel. This panel is connected to the ear E of an animal A or, if desired, to any other loose skin portion such as the dewlap of an animal. The panel 20 may be of any suitable shape such as circular, rectangular or hexagonal and such shaping may even be varied to assist in special classification of a flock of animals if desired.

The construction illustrated at FIG. 3 is one preferred shape wherein the panel is generally a symmetrical, fivesided member including a bottom portion 22 and side portions 23 in a rectangular arrangement with a vertical axis of symmetry. This tag is suspended from a centered neck 24 and the top portion is formed as two sloping shoulders 25, one from each side of the base of the neck to join with the sides 23.

The neck 24 which upstands from the panel carries an enlarged triangular head 26 at its top which is symmetrical with the vertical axis of the tag and is in a general arrangement of a flat arrowhead. Locking ledges 27 outstand from each side of the base of this head 26 at the juncture of the neck. As will be further described, this tag is attached to the ear of an animal by cutting a slit S through the ear and threading the head of the tag through the slit, with the width of the slit being approximately the width of the neck, and the locking ledges 27 will extend beyond the slit to secure the tag in place, as in the manner clearly illustrated at FIG. 2. When the tag is thus attached, with the panel 20 being suspended from the neck 24, the sloping shoulders 25 will help protect this tag against pulling loose from the animal in that the shoulders permit the tag to be more easily pulled away from entangling brush and the like which the animal may encounter when it is grazing.

Figures 4, 5, 6:
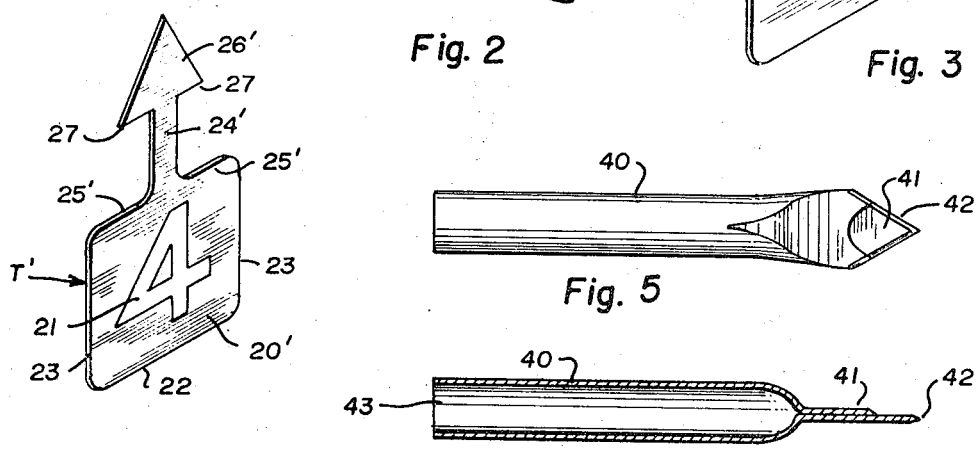
FIG. 4 is an isometric view of another form of tag constructed according to the principles of the invention.
FIG. 5 is a plan view of an improved insertion tool especially for the tags shown at FIGS. 3 and 4.
FIG. 6 is a longitudinal sectional side view of the tool illustrated at FIG. 5.

Certain variations of this tag T are expedient. The unit illustrated at FIG. 3 is especially suitable as an ear tag, and for such use, the neck is folded at right angles, as by fold 28, to place the head 26 in a plane substantially normal to the plane of the panel 20. A modified tag T', illustrated at FIG. 4, is preferred where it is to be attached to the dewlap of an animal. The panel 20' is formed more nearly as a true rectangle with comparatively flat shoulders 25' and a substantially longer neck 24' is desired. Also, the folding of the neck may not be necessary or desirable. A further modification of a tag can be obtained for use with sheep where it is desired to provide for a comparatively long neck 24 to permit the tag to hang a substantial distance below the animal's ear.

The tag T is preferably made of polyurethane sheet material by simply stamping the tags out of flat sheet stock. This sheet stock, which may be from 1/20 to 1/16-inch thick, is a commercial item available in various colors ranging from black to white. Various inks and paints are available which can be used to mark the numbers 21 on the panel of each tag, either at the time they are being manufactured, or when they are ready for application to livestock, the latter being preferred by many ranchers. Polyurethane is an ideal material for this purpose for the synthetic resin will not irritate tissue, and it may be obtained as a moderately rigid, yet tough, pliable material which can be flexed for insertion into a slit in an animal's ear and then locked in place as described. However, because it is pliable, it can be pulled from an animal's ear without tearing the ear tissue, although the force required to do this is considerably more of an ordinary pull to which the tag will be subjected when it is being worn by an animal, as when it becomes entangled with brush or the like. A further advantage to polyurethane is its immunity to sunlight and other weather effects, especially when it is protectively pigmented, as heretofore mentioned.

It is also contemplated that the tag T may be manufactured by injection molding processes, and the mode of manufacture will be largely a matter of economics. Injection molding is preferable when large numbers of the tags are to be produced at one time. Injection molding also permits the tag to be initially formed with the fold 28 at the neck while with the method of stamping the tags from sheet stock, this fold 28 at the neck has to be formed in a subsequent operation. However, such is a simple matter. For example, the tags may be laid on an edge of a table with the neck and head portions being cantilevered thereover. They are then heated with a heat lamp to a temperature approaching the softening point temperature of the polyurethane, whereupon the folds 28 will form as the head portions drop.

The operation of threading a tag into the slit of an animal's ear may be accomplished manually. First, a slit as wide as the neck 24 is cut through the animal's ear, as with a pen knife. Then, the locking ledges 27 are folded upon the face of the head 26 to overlap them out of the way, and finally the folded head is pushed through the ear slit. Such an operation is cumbersome and generally unsatisfactory and renders the tag T an impractical item. Accordingly, an improved applicator tool and method of application was conceived and developed to apply this tag into the ear of an animal by a quick, simple movement, with the very simplicity and ease of using the applicator rendering the improved and simplified tag construction a highly practical item.

The applicator 40 as illustrated at FIGS. 5 and 6 is a simple hollow spike formed of a hard, thin-walled metal tube having a diameter slightly less than the width of the neck 24 of a tag to be used with the applicator. The leading end 41 of this tubular applicator is flattened, with the leading edge 42 being sharpened and sloped from each side of the center to form a spear-like cutting edge the full width of the flattened portion of the applicator. It is to be noted that in flattening the tube, the end 41 is made wider than the tube diameter, and that by using a tube having a diameter slightly less than the width of the neck 24 of a tag to be used, the cutting edge 42 will have a width the same as or only slightly greater than the width of the neck 24. It follows that when this spike is pushed through the ear or through a fold of skin of an animal, the cutting edge 42 will cut a slit having a width sufficient to permit the cylindrical body of the spike to be easily passed through the ear and a width sufficient to comfortably hold the neck 24 of a tag T.

Figures 7, 8, 9:
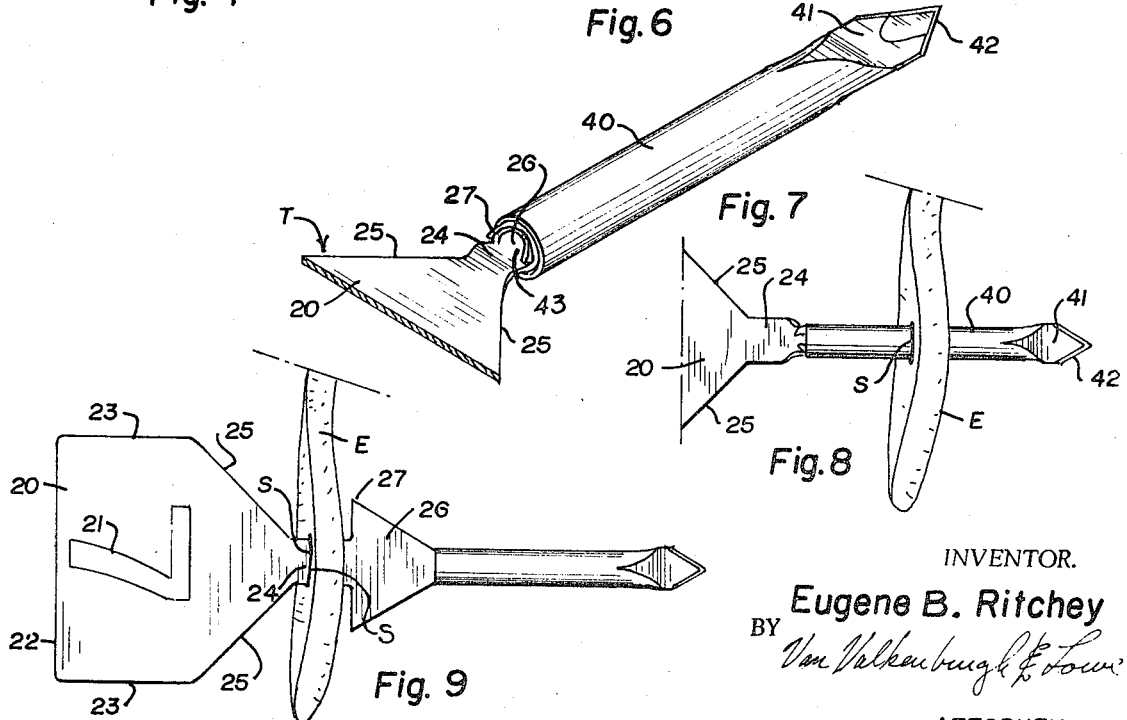
FIG. 7 is an isometric view of the tool and a tag mounted within the tool preparatory to inserting the same into the ear of an animal, but with only a portion of the tag being shown to conserve space.
FIG. 8 is a diagrammatic plan view at the tool and of the tag mounted therein, the same as the showing at FIG. 7, but on a reduced scale and with the tool being partially inserted into the ear of an animal.
FIG. 9 is a diagrammatic plan view, similar to FIG. 8, but showing the tool as being pulled through the animal's ear and the tag as being inserted into the slit in the animal's ear cut by the insertion tool when it was passed through the animal's ear.

The trailing end 43 of this cylindrical spike is open and is adapted to receive the head 26 of a tag when the locking ledges 27 are tightly overfolded upon the central portion of the head 26, as in the manner illustrated at FIGS. 7 and 8. This is a manual operation which can be performed rapidly with a little practice. In so arranging the tag within the trailing end 43 of the spike, it is desirable to orient the plane of the panel of the tag and of the neck in parallelism with the flat surface of the leading end 41 of the spike, as in the manner illustrated, so that the neck 24 will be oriented to be immediately properly positioned in the ear slit formed by the cutting edge 42.

The operation of applying this tag by using the spike is illustrated at FIGS. 8 and 9. Once the tag is threaded into the trailing end 43 of the spike, as illustrated at FIG. 7, it is simply pushed through the ear of an animal with the leading cutting edge forming a slit of proper width. As the spike is pulled through the animal's ear, the friction of the tag neck 24 in the slit or the shoulders 25 at the base of the neck 24 will stop further movement of the tag into the ear slit, and the spike will simply disconnect from the head to permit the ledges 27 to snap outwardly to the plane of the head 26 and lock the tag in place. The light weight of the tag and the flat neck 24 in the slit S will cause a minimum of irritation, and healing of the slit S will be rapid and substantially painless.

Once the applicator spike 40 is passed through an animal's ear to form the slit and set the tag, its function is completed and it is ready for connection with another tag. This tool is of such low cost that it may be included as a complimentary item even with small orders of tags, and as such permits an owner of only a few head of livestock to use a high-quality ear tag without incurring a substantial investment in a high-priced tag applicator.

I have now described my invention in considerable detail; however, it is obvious that others skilled in the art can build and devise alternate and equivalent constructions which are within the spirit and scope of my invention. Hence, I desire that my protection be limited, not by the constructions illustrated and described, but only by the proper scope of the appended claims.

I claim:

1. A loopless livestock identification tag comprising: first and second ends thereof joined by a neck portion; said first end including a substantially flat panel section adapted to receive indicia marking; said second end including an anchoring head having shoulders of resilient foldable material extending laterally outwardly from respective sides of said neck with their bottom edges extending substantially perpendicular to the axis of said tag extending through the centers of said anchoring head and said panel section and operative by their resiliency to be folded and to automatically unfold after being passed through a slit in the animal's skin, the neck portion, the bottom edges of said anchoring head, and the top edges of said panel section forming means to hold the tag in the slit without the formation of a closed loop.

2. A loopless livestock identification tag comprising: first and second ends thereof joined by a neck portion; said first end including a substantially flat panel section adapted to receive indicia marking; said second end including an anchoring head having shoulders of resilient foldable material extending laterally outwardly from respective sides of said neck with their bottom edges extending outwardly from a plane passing through the center of said anchoring head and said neck and said panel section, said shoulders being operative by their resiliency to be folded and to automatically unfold after being passed through a slit in the animal's skin; the neck portion, the bottom edges of said anchoring head, and the top edges of said panel section forming means to hold the tag in the slit without the formation of a closed loop; and wherein the tag is constructed with said neck bent at a substantially right angle to the plane of said panel section.

3. A loopless livestock identification tag comprising: first and second ends thereof joined by a neck portion; said first end including a substantially flat panel section adapted to receive indicia marking; said second end including an anchoring head having shoulders of resilient foldable material extending laterally outwardly from respective sides of said neck with their bottom edges extending outwardly from a plane passing through the center of said anchoring head and said neck and said panel section, said shoulders being operative by their resiliency to be folded and to automatically unfold after being passed through a slit in the animal's skin; the neck portion, the bottom edges of said anchoring head, and the top edges of said panel section forming means to hold the tag in the slit without the formation of a closed loop; and wherein said anchoring head is of a substantially flat construction and the neck is constructed with said neck bent so that said anchoring head is in a plane that is substantially parallel to said panel.

4. In combination, a loopless livestock identification tag and an insertion tool therefor, said tag comprising: first and second ends thereof joined by a neck portion; said first end including a substantially flat panel section adapted to receive indicia marking; said second end including an anchoring head having shoulders of resilient foldable material extending laterally outwardly from respective sides of said neck and operative by their resiliency to be folded and to automatically unfold after being passed through a slit in the animal's skin, the neck portion, the shoulders of said anchoring head, and the top edges of said panel section forming means to hold the tag in the slit; said insertion tool being sharpened at one end for making said slit in said animal's skin and having means to hold said anchoring head for threading said head through said slit.

5. The apparatus of claim 4 wherein said insertion tool has a tubular portion for holding said anchoring head during said threading.

6. A method for inserting into a slit in the ear or like tissue of an animal an ear tag having a panel section connected to an anchoring head by a neck, said anchoring head having laterally extending shoulders of resilient foldable material with their bottom edges extending substantially perpendicular to the axis of said tag passing through the centers of said anchoring head and said panel, said method comprising: cutting a slit in the animal's tissue having a width not substantially greater than the width of said neck; and passing said anchoring head through said slit with said shoulders folded to permit passage of said anchoring head through said slit; whereby said resilient shoulders unfold after passing through said slit to lock said tag in said slit with the tissue of the animal being between the bottom edges of said shoulders and the top edges of said panel.

7. The method of claim 6 including the step of affixing said tag to a tool adapted to form a slit in said ear or tissue prior to passing said head with its shoulders folded through said slit, and further including the steps of: passing said tool with said tag affixed thereto through said slit with said resilient shoulders of said anchoring head folded so that said anchoring head is passed through said slit with said tool; and removing said tool from said slit; whereby said anchoring head is removed from said tool and said resilient shoulders of the anchoring head unfold to lock said tag in said slit.

8. A method for inserting into a slit in the ear or like tissue an ear tag of substantially flat construction having a panel section, a neck of lesser width than that of the panel outstanding from one edge thereof, and a locking head at the other end of the neck having locking ledges of resilient foldable material outstanding from each side edge of the neck, said method comprising: cutting a slit in said tissue having a width not substantially greater than the width of said neck; folding said ledges; placing said head with its folded ledges in an open end of a tube adapted to fit into the slit; and passing the tube through said slit with the other end leading to contact said one edge of said panel section with the animal's skin and thereby remove said head from the tool to permit said ledges to unfold and lock the tag in said slit.

9. The combination of an identifictaion tag and an insertion tool therefor, comprising: a tag for insertion into a slit in the ear or like tissue of an animal, said tag comprising a panel section of substantially flat construction, a locking head, and a neck of lesser width than said panel section and locking head for connecting said panel section to said locking head, said locking head having locking ledges of resilient, foldable material outstanding from the sides of said neck; an insertion tool for said tag comprising:
  (i) a body portion substantially the same width as said neck and having one end thereof sharpened to provide a leading cutting edge for cutting said slit in said animal's skin; and
  (ii) means for detachably receiving said locking head so that said locking ledges are folded upon passage of said tool through said slit; whereby said tag is adapted to be inserted into the skin of said animal by piercing a slit in the animal's skin with said sharpened end of said leading cutting edge and pulling said tool and said tag through said slit and said tag is adapted to be retained in said slit by said locking ledges which unfold and lock said tag in said slit when said tool is detached therefrom.

10. A combination marking tag and insertion tool therefor comprising:
   a flat tag having a marking panel;
   a head with locking ledges;
   a slender neck connecting said panel and head having a width less than either the panel or head; and
   an insertion tool for said tag comprising:
     a tubular body having one end flattened and sharpened to provide a leading cutting edge for cutting a slit in an animal's skin and having its other end open to receive said tag head with the locking ledges folded, the diameter of the tool being slightly less than the neck width to limit the width of the slit cut by the leading edge of the tool to a width substantially the same as the width of the neck;
   said tag attached to said insertion tool by insertion of the head with the edges folded into said open end, whereby a tag is inserted into the skin of an animal by piercing a slit in the skin with said sharpened end and pulling the tool through said slit to contact said panel with the animal's skin and thereby remove said head from the tool to permit said edges to unfold and lock the tag in said slit.

References Cited

UNITED STATES PATENTS 2,097,965  11/1937  Caulk _____ 40—22

WILLIAM H. GRIEB, Primary Examiner